3,497,543
S-LOWERALKYL SUBSTITUTED BENZHY-
DRYLTHIOLCARBONATES
Sidney B. Richter and David P. Mayer, Chicago, Ill., assignors to Velsicol Chemical Corporation, Chicago, Ill., a corporation of Illinois
No Drawing. Filed June 19, 1967, Ser. No. 647,219
Int. Cl. C07c 154/00, 87/50; A01n 9/12
U.S. Cl. 260—455
7 Claims

ABSTRACT OF THE DISCLOSURE

A compound of the formula

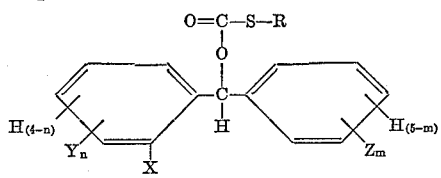

wherein X is dialkylamino; Y and Z are independently selected from the group consisting of alkyl, alkenyl, halogen, nitro, thioalkyl, alkoxy and dialkylamino; R is alkyl; $n$ an integer from 0 to 4; and $m$ is an integer from 0 to 5.

An acaricidal and insecticidal composition comprising an inert carrier and, in a quantity toxic to acarids or insects, a compound of this invention. A method for the control of acarids and insects which comprises applying to said acarids or insects a composition comprising an inert carrier and as an essential active ingredient in a quantity toxic to acarids or insects a compound of this invention.

---

This invention relates to new compositions of matter. More particularly, this invention relates to new chemical compositions of the formula

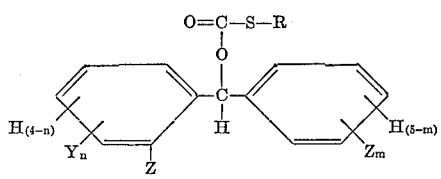

wherein X is dialkylamino; Y and Z are independently selected from the group consisting of alkyl, alkenyl, halogen, nitro, thioalkyl, alkoxy, and dialkylamino; R is alkyl; $n$ is an integer from 0 to 4; and $m$ is an integer from 0 to 5.

In a preferred embodiment of this invention R has a maximum of 4 carbon atoms; X is di (ower alkyl) amino; $n$ is an integer from 0 to 2; and $m$ is an integer from 0 to 3.

Unexpectedly, the compounds of the present invention are effective as insecticides and acaricides.

The compounds of the present invention can be readily prepared from the corresponding substituted dialkyl-amino-benzhydrol compounds by reacting the benzhydrol in pyridine with a slight molar excess of an alkyl chlorothioformate. This reaction can be carried out at room temperature, with constant stirring, for a period of at least 15 minutes. After this time, the reaction mixture can be diluted with cold water and extracted with ether. The ether extract can then be dried over anhydrous magnesium sulfate, evaporated under reduced pressure at a temperature below about 60° C. to yield the desired benzhydrylthiolcarbonate.

Suitable dialkylaminobenzhydrol reactants useful in the preparation of the compounds of this invention can be readily prepared by several methods from the corresponding dialkylaminobenzophenone, for example by reduction with lithium aluminum hydride. The dialkylaminobenzophenone can be prepared from the corresponding aminobenzophenone by alkylation procedures well known to the art, such as treatment with dimethylsulfate, formic acid and formaldehyde, alkyl halides, and combinations thereof. In some cases the dialkylaminobenzophenone can be prepared from the corresponding halobenzophenone by reaction with dialkylamines, such as N,N-diethylamine, N,N-dimethylamine, N-methyl-N-ethylamine, N-methyl-N-isopropylamine, N-methyl-N-n-propylamine, N-methyl-N-n-butylamine, N-methyl-N-sec-butylamine, N-methyl-N-amylamine, N-ethyl-N-n-propylamine, and N-ethyl-N-isopropylamine. Exemplary of various starting materials are: 2-bromobenzophenone, 2,2'-dibromobenzophenone, 2,4-dibromobenzophenone, 2,6-dibromobenzophenone, 2-bromo-5-chlorobenzophenone, 2-bromo-3'-chlorobenzophenone, 2-bromo - 3',5 - dichlorobenzophenone, 2-bromo-4-methylbenzophenone, 2-amino-4'-bromobenzophenone, 2-amino-5'-bromobenzophenone, 2-amino-5'-chlorobenzophenone, 4 - amino-2'-chlorobenzophenone, 2-amino-5-chloro-4'-methoxybenzophenone, 2'-amino-3-chloro-4-methylbenzophenone, 4 - amino-2-chloro-2'-methylbenzophenone, 2 - amino-4,5-dichlorobenzophenone, 2-amino-2',4-dimethoxybenzophenone.

The aminobenzophenones can be readily prepared by the Friedel-Crafts reaction of a suitably substituted benzoyl chloride with aniline or a suitably substituted aniline. This reaction, well known in the art, can be carried out, for example, by heating a substituted benzoyl chloride to about 120° C., adding a substituted aniline, heating the reaction mixture to about 180° C., adding zinc chloride and reacting the mixture at about 220° C. for a period of about ½ to about 2 hours. The product can be dissolved in an organic solvent, washed with an inorganic base, dried and recovered by stripping off the solvent to yield the desired aminobenzophenone.

Exemplary of suitable anilines are 4-chloroaniline, 4-bromoaniline, 4-methylaniline, 3-chloroaniline, 4-methoxyaniline, 4-methylthionaniline, 4-nitroaniline, 4-allylaniline, 3,5-dichloroaniline, 3-methylaniline, 2,4-dichloroaniline and the like.

Exemplary of suitable benzoyl chlorides are 2-methylbenzoyl chloride, 4-chlorobenzoyl chloride, 4-methoxybenzoyl chloride, 3-methoxy-4-methylbenzoyl chloride, 3,4-dimethylbenzoyl chloride, 4-methylbenzoyl chloride, 2-chlorobenzoyl chloride, 4-nitrobenzoyl chloride, 2-allylbenzoyl chloride.

Exemplary of suitable alkyl chlorothiolformates for use in preparing the compounds of this invention are methyl chlorothiolformate, ethyl chlorothiolformate, n-propyl chlorothiolformate, isopropyl chlorothiolformate, n-butyl chlorothiolformate, sec-butyl chlorothiolformate.

The manner in which the new compounds of the present invention can be prepared readily is illustrated in the following examples.

Example 1.—Preparation of 2-dimethylamino-5-chlorobenzhydrol 2-amino-5-chlorobenzophenone (11.5 grams; 0.05 mol), formic acid (23 ml.; 0.6 mol) and formaldehyde (15 ml.; 38% assay) were placed in a 250 ml. glass reaction flask equipped with mechanical stirrer, internal thermometer and reflux condenser. The reaction mixture was heated at reflux, with continuous stirring, for a period of about 17 hours. After this time the reaction mixture was diluted with water (200 ml.) and extracted twice with ether. The two ether extracts were combined and washed first with aqueous sodium hydroxide (50 ml.; 3 N) and then with water. The washed ether extract was dried over magnesium sulfate, filtered and evaporated on a steam bath. The residue was triturated with cold pentane and recovered by filtration to yield 2-dimethylamino-5-chlorobenzophenone as a yellow solid having a melting point of 88 to 90° C.

A solution of lithium aluminum hydride (10 grams; 0.3 mol) in ether (800 ml.) was charged into a 2000 ml. glass reaction flask equipped with mechanical stirrer, internal thermometer and reflux condenser topped with drying tube. A solution of 2-dimethylamino-5-chlorobenzophenone (18 grams; .07 mol) in ether (500 ml.) was added to the reaction flask over a period of about 15 minutes with continuous stirring. The reaction mixture was heated at reflux, with stirring, for a period of about 6 hours. After this time the reaction mixture was allowed to stand over the weekend at room temperature. A solution of sodium potassium tartrate (7.8 grams; 0.03 mol) in water (40 ml.) was added dropwise, with stirring, to the reaction mixture. The resulting mixture was filtered and the filter cake washed with ether. The filtrate was dried over magnesium sulfate, filtered and evaporated on a steam bath. The residue was recrystallized from ethanol to yield 2-dimethylamino-5-chlorobenzhydrol having a melting point of 87 to 89° C.

Example 2—Preparation of S-ethyl-2-dimethylamino-5-chlorobenzhydrylthiocarbonate 2-dimethylamino-5-chlorobenzhydrol (2.6 grams; 0.01 mol) and pyridine (30.0 ml.) were placed in a 250 ml. glass reaction flask equipped with mechanical stirrer and internal thermometer. Ethyl chlorothiolformate (3 ml.; .02 mol ) was slowly added, with stirring, to the reaction mixture raising the temperature to about 40° C. The reaction mixture was allowed to cool to room temperature after which water (150 ml.) was added. The mixture was extracted with ether and the extract was dried over anhydrous magnesium sulfate and filtered. The filtrate was evaporated under reduced pressure on a steam bath and the residue allowed to stand under 0.1 mm. Hg pressure for about ½ hour to yield S-ethyl-2-dimethylamino-5-chlorobenzhydrylthiolcarbonate as the product having the following elemental analysis.

Analysis for $C_{18}H_{20}ClNO_2S$.— Theoretical, percent: C, 61.79; H, 5.76; S, 9.16. Found, percent: 62.79; H, 6.21; S, 9.43.

Example 3.—Preparation of 2-dimethylamino-5-chloro-4'-methylbenzophenone

Para-methylbenzoyl chloride (33.3 grams; 0.2 mol) was heated, with stirring to about 120° C. in a glass reaction flask equipped with mechanical stirrer, internal thermometer and reflux condenser. Para-chloroaniline (6.4 grams; 0.05 mol) was slowly added to the flask over a period of 15 minutes and the mixture was heated to 180° C. Dry zinc chloride (17.44 gms.) was then added and the reaction mixture heated to a temperature of from about 220 to about 240° C. for a period of about 2 hours. After this time the reaction mixture was cooled to about 120° C. A mixture of glacial acetic acid (40 ml.) and hydrogen bromide (40 ml.; assay 48%) was added to the reaction flask and refluxed overnight. The reaction mixture was then concentrated under reduced pressure by removing excess solvent. The residue was refluxed for about 40 minutes in sulfuric acid (64 ml.; 75% v./v.) and poured over crushed ice. The resulting mixture was extracted with ether and the ether extract washed first with sodium hydroxide (100 ml.; 3 N) and then with water. The extract was then dried over magnesium sulfate, filtered and evaporated. The residue was distilled to yield 2-amino-5-chloro-4'-methylbenzophenone.

2-amino-5-chloro - 4' - methylenzophenone (8.4 gms.; .03 mol), formic acid (23 ml.; 0.6 mol) and formaldehyde (15 ml.; 38% assay) were charged into a 250 ml. glass reaction flask equipped with mechanical stirrer, reflux condenser and internal thermometer. The reaction mixture was refluxed for a period of about 17 hours. After this time the mixture was diluted with water (200 ml.) and extracted two times with ether. The two ether extracts were combined and washed first with aqueous sodium hydroxide (100 ml.; 3 N) and then with water. The ether extract was then dried over magnesium sulfate, filtered and evaporated. The residue was distilled to yield 2-dimethylamino-5-chloro - 4' - methylbenzophenone as a yellow liquid having a boiling point of 136 to 141° C. at 0.02 mm. Hg pressure.

Example 4.—Preparation of 2-dimethylamino-5-chloro-4'-methylbenzohydrol

A solution of lithium aluminum hydride (1.5 grams; 0.04 mol) in ether (100 ml.) was charged, with stirring, into a 250 ml. glass reaction flask equipped with mechanical stirrer, internal thermomether and reflux condenser. A solution of 2-dimethylamino-5-chloro-4'-methylbenzophenone(7.0 grams; 0.03 mol) in ether (100 ml.) was added to the reaction flask over a period of about 15 minutes with continuous stirring. The reaction mixture was then heated at reflux with continuous stirring for a period of about 6 hours. After this time the reaction mixture was cooled to room temperature. A solution of sodium potassium tartrate (1.5 grams) dissolved in water (6 ml.) was added dropwise, with stirring to the cooled reaction mixture. The resulting mixture was filtered and the filter cake washed with ether. The filtrate was dried over magnesium sulfate, filtered and evaporated to yield a liquid as the residue. The residue was distilled under vacuum to yield 2-dimethylamino-5-chloro - 4' - methylbenzhydrol having a boiling point of 137 to 142° C. at 0.05 mm. Hg pressure.

Example 5.—Preparation of S-ethyl-2-dimethylamino 5-chloro-4'-methylbenzhydrylthiolcarbonate 2-dimethylamino - 5 - chloro-4'-methylbenzhydrol (2.3 grams; .01 mol) and pyridine (30.0 ml.) were placed in a 250 ml. glass reaction flask equipped with mechanical stirrer and internal thermometer. Ethyl chlorothiolformate (1.5 grams; 0.1 mol) was slowly added to the reaction mixture which was kept below about 20° C. by external cooling. The mixture was stirred for a period of about one hour and water (200 ml.) was added. The reaction mixture was then extracted with ether and the ether extract dried over anhydrous magnesium sulfate and filtered. The filtrate was evaporated under reduced pressure at 60° C. and the residue held at 0.05 mm. Hg pressure for about 1½ hours to yield S-ethyl-2-dimethylamino - 5 - chloro - 4' - methylbenzhydrylthiolcarbonate having the following elemental analysis.

Analysis for $C_{19}H_{22}ClNO_2S$.—Theoretical, percent: C, 62.71; H, 6.09; S, 8.81. Found, percent: C, 61.84; H, 6.20; S, 10.49

Example 6—Preparation of 2-dimethylamino-5-chloro-3'-methylbenzophenone 3-methylbenzoyl chloride (30 grams; 0.2 mol) was heated with stirring to about 120° C. in a 250 ml. glass reaction flask equipped with mechanical stirrer, internal thermometer and reflux condenser. Para-chloroaniline (12 grams; 0.1 mol) was slowly added to the flask over a period of 15 minutes and the mixture was heated to about 180° C. Dry zinc chloride (17 grams) was added and the reaction mixture was heated to a temperature of from about 220 to about 230° C. for a period of about 2 hours. After this time the reaction mixture was cooled to about 120° C. A mixture of concentrated hydrochloric acid (35 ml.) and concentrated acetic acid (35 ml.) was then added and the reaction mixture was refluxed for about 17 hours. The mixture was then concentrated under reduced pressure and the residue poured over crushed ice. The resulting mixture was extracted with ether and the ether extract washed, first with aqueous sodium hydroxide (100 ml.; 3 N) and then with water (100 ml.). The washed extract was then dried over magnesium sulfate, filtered and evaporated under reduced pressure. The residue was vacuum distilled to yield 2-amino-5-chloro-3'-methylbenzophenone as a viscous yellow liquid having a boiling point of 145 to 150° C. at 0.02 mm. Hg pressure.

2-amino - 5 - chloro-3'-methylbenzophenone (8 grams; 0.03 mol), formic acid (23 ml.; 0.6 mol) and fodmaldehyde (15 ml.; 38% assay) were charged into a 250 ml. glass reaction flask equipped with mechanical stirrer, internal thermometer and reflux condenser. The reaction mixture was heated at reflux, with stirring, for a period of about 17 hours. After this time the mixture was cooled, diluted with water (200 ml.) and extracted twice with ether. The ether extracts were combined and washed, first with aqueous sodium hydroxide (100 ml.; 3 N) and then with water (100 ml.). The washed extract was dried over magnesium sulfate, filtered and evaporated on a steam bath. The residue was vacuum distilled to yield 2-dimethylamino-5-chloro-3'-methylbenzophenone as a viscous yellow liquid having a boiling point of 130 to 135° C. at 0.02 mm. Hg pressure.

Example 7.—Preparation of 2-dimethylamino-5-chloro-3'-methylbenzhydrol

A solution of lithium aluminum hydride (1.5 grams; 0.04 mol) in ether (100 ml.) was charged, with stirring, into a 250 ml. glass reaction flask equipper with mechanical stirrer, internal thermometer and reflux condenser. A solution of 2 - dimethylamino - 5-chloro-3'-methylbenzophenone (7.0 grams; 0.03 mol) in ether (100 ml.) was then slowly added to the flask over a period of 15 minutes. The reaction mixture was heated at reflux for a period of about 6½ hours. The reaction mixture was then cooled to room temperature. A solution of sodium potassium tartrate (1.5 grams) in water (6 ml.) was added dropwise, with stirring, to the cooled reaction mixture. The resulting mixture was filtered and the filter cake washed with ether. The filtrate and the washings were combined, dried and evaporated, leaving a liquid residue. The residue was vacuum distilled to yield 2-dimethylamino-5-chloro - 3' - methylbenzhydrol having a boiling point of 132 to 136° C. at 0.02 mm. Hg pressure.

Example 8.—Preparation of S-ethyl-2-dimethylamino-5-chloro-3'-methylbenzhydrylthiolcarbonate 2-dimethylamino-5-chloro - 3' - methylbenzhydrol (2.3 grams; 0.01 mol) and pyridine (30 ml.) were placed in a 250 ml. glass reaction flask equipped with stirrer and internal thermometer. Ethyl chlorothiolformate (1.5 grams; 0.01 mol) was slowly added to the reaction mixture which was kept below about 20° C. by external cooling. The mixture was stirred for a period of about 1 hour and water (200 ml.) was added. The reaction mixture was then extracted with ether and the ether extract dried over anhydrous magnesium sulfate and filtered. The ether solution was evaporated in a rotary evaporator under 0.02 mm. Hg pressure at about 50 to about 60° C. for about 1 hour to yield S-ethyl-2-dimethylamino-5-chloro-3'-methylbenzhydrylthiolcarbonate having the following elemental analysis.

*Analysis for* $C_{19}H_{22}ClNO_2S$. — Theoretical, percent: C, 62.71; H, 6.09; S, 8.81. Found, percent: C, 61.91; H, 6.18; S, 10.75.

Example 9.—Preparation of 2-dimethylamino-5-chloro-4'-methylbenzophenone o-Methylbenzoyl chloride (17.4 grams; 0.1 mol) was heated with stirring to about 125° C. in a 250 ml. glass reaction flask, equipped with mechanical stirrer, internal thermometer and reflux condenser. p-Chloroaniline (6.4 grams; .05 mol) was slowly adde to the flask over a period of 15 minutes, and the mixture was heated to 180° C. Dry zinc chloride (6.4 grams) was added and the reaction mixture was heated to a temperature of from about 225 to about 230° C. for a period of about 2 hours. After this time the reaction mixtuer was cooled to about 120° C. A mixture of glacial acetic acid (40 ml.) and hydrogen bromide (40 ml.; assay 48%) was added to the reaction mixture and refluxed for a period of about 17 hours. After this time the reaction mixture was concentrated under reduced pressure and hydrochloric acid (100 ml.; 3 N) was added. The mixture was heated to boiling and was decanted. The residue was heated to reflux for about 40 minutes in sulfuric acid (32 ml.; 75% v./v.) and poured over ice. The resulting mixture was extracted twice with ether and the combined ether portions washed with 3 N hydrochloric acid, with 5 N sodium hydroxide and with water. The washed extract was dried over magnesium sulfate, filtered and evaporated to yield a red viscous oil. The oil was distilled to yield 2-amino-5-chloro-2'-methylbenzophenone having a boiling point of 130 to 140° C. at 0.02 mm. Hg pressure.

2-amino-5-chloro - 2' - methylbenzophenone (8 grams; 0.03 mol), prepared above, and trimethylphosphate (12 grams; 0.09 mol) were charged into a 250 ml. glass reaction flask equipped with stirrer, thermometer and reflux condenser. The reaction mixture was heated with stirring at about 160° C. for a period of about 2½ hours. After this time the reaction mixture was cooled to 120° C. and a solution of sodium hydroxide (10 grams) in water (75 ml.) was added. The reaction mixture was then refluxed for about 1½ hours and let stand at room temperature overnight. The reaction mixture was then extracted with ether, the ether extract dried over magnesium sulphate, filtered and evaporated. The residue was vacuum distilled to yield 2 - dimethylamino-5-chloro-2'-methylbenzophenone as a yellow liquid.

Example 10.—Preparation of 2-dimethylamino-5-chloro-2'-methylbenzhydrol

A solution of lithium aluminum hydride (1.5 grams; 0.04 mol) in ether (100 ml.) was charged, with stirring, into a 500 ml. glass reaction flask equipped with stirrer, internal thermometer and reflux condenser. A solution of 2 - dimethylamino-5 - chloro-2'-methylbenzophenone (5.9 grams; 0.02 mol) in ether (100 ml.) was added to the reaction flask over a period of about 15 minutes with continuous stirring. The reaction mixture was then heated at reflux for a period of about 3½ hours. After this time the reaction mixture was cooled to room temperature. A solution of sodium potassium tartrate (1.5 grams) in water (6 ml.) was then added dropwise, with stirring, to the cooled reaction mixture. The resulting mixture was allowed to stand overnight and was then distilled under reduced pressure to yield 2 - dimethyl-amino-5-chloro-2'-methylbenzhydrol having a boiling point of 143 to 152° C. at 0.15 mm. Hg pressure.

Example 11.—Preparation of S-ethyl-2-dimethyl-amino-5-chloro-2'-methylbenzhydrylthiolcarbonate 2-dimethylamino-5-chloro - 2' - methylbenzhydrol (2.3 grams; 0.01 mol) and pyridine (30 ml.) were placed in a 250 ml. glass reaction flask equipped with stirrer and internal thermometer. Ethyl chlorothiolformate (1.5 grams; 0.01 mol) was slowly added to the reaction mixture which was kept below about 20° C. by external cooling. The mixture was stirred for a period of about 1 hour and water (200 ml.) was added. The reaction mixture was then extracted with ether and the ether extract dried over anhydrous magnesium sulfate and filtered. The filtrate was evaporated under reduced pressure at 60° C. and the residue held under 0.05 mm. Hg pressure for about 1½ hours to yield S-ethyl-2-dimethylamino-5-chloro-2'-methylbenzhydryl-thiolcarbonate having the following elemental analysis.

*Analysis for* $C_{19}H_{22}ClNO_2S$.—Theoretical, percent: C, 62.71; H, 6.09; S, 8.81. Found, percent: C, 63.87; H, 6.32; S, 9.63.

Example 12.—Preparation of 2-dimethylamino-4',5-dichlorobenzophenone 2-amino-4',5-dichlorobenzophenone (8 grams; 0.03 mol), formic acid (23 ml.; 0.6 mol), and formaldehyde (15 ml.; assay 38%) were charged into a 250 ml. glass reaction flask equipped with mechanical stirrer, internal thermometer and reflux condenser. The reaction mixture was refluxed with continuous stirring for a period of about 17 hours. After this time the reaction mixture was diluted with water (200 ml.) and extracted twice with ether. The two ether extracts were combined and washed first with aqueous sodium hydroxide (100 ml.; 3 N) and then with water. The extract was then dried over magnesium sulfate, filtered and evaporated on a steam bath. The residue was vacuum distilled to yield 2-dimethylamino-4',5-dichlorobenzophenone as a yellow liquid having a boiling point of 140 to 145° C. at 0.05 mm. Hg pressure.

Example 13.—Preparation of 2-dimethylamino-4',5-dichlorobenzhydrol

A solution of lithium aluminum hydride (1.5 grams; 0.04 mol) in ether (100 ml.) was charged, with stirring, into a 500 ml. glass reaction flask equipped with mechanical stirrer, internal thermometer and reflux condenser. A solution of 2-dimethylamino-4',5-dichlorobenzophenone (7.1 grams; 0.03 mol) in ether (100 ml.) was slowly added to the reaction flask over a period of about 15 minutes. The reaction mixture was heated at reflux for a period of about 6½ hours. After this time the reaction mixture was cooled to room temperature. A solution of sodium potassium tartrate (1.5 grams) in water (6 ml.) was added dropwise, with stirring, to the cooled reaction mixture. The resulting mixture was filtered and the filter cake washed with ether. The filtrate was dried over magnesium sulfate, filtered and evaporated to yield a liquid as the residue. The residue was distilled under vacuum to yield 2-dimethylamino-4',5-dichlorobenzhydrol having a boiling point of 150 to 155° C. at 0.02 mm. Hg pressure.

Example 14.—Preparation of S-ethyl-2-dimethylamino-4',5-dichlorobenzhydrylthiocarbonate 2 - dimethylamino-4',5-dichlorobenzhydrol (2.3 grams; 0.01 mol) and pyridine (30 ml.) were placed in a 250 ml. glass reaction flask equipped with stirrer and internal thermometer. Ethyl chlorothiolformate (1.5 grams; 0.01 mol) was slowly added to the reaction mixture which was kept below about 20° C. by external cooling. The mixture was stirred for a period of about 1 hour and water (200 ml.) was added. The reaction mixture was then extracted with ether and the ether extract dried over anhydrous magnesium sulfate and filtered. The ether solution was evaporated under 0.02 mm. Hg pressure at about 50 to 60° C. for about 1½ hours to yield S-ethyl-2-dimethylamino-4',5-dichlorobenzhydrylthiolcarbonate having the following elemental analysis.

Analysis for $C_{18}H_{19}Cl_2NO_2S$.—Theoretical, percent: C, 56.25; H, 4.98; S, 8.34. Found, percent: C, 56.78; H, 5.15; S, 8.16.

Example 15.—Preparation of 2-dimethylamino-3',5-dichlorobenzophenone 2-amino-3',5-dichlorobenzophenone (8 grams; 0.03 mol), formic acid (23 ml.; 0.6 mol) and formaldehyde (15 ml.; assay 38%) were charged into a 250 ml. glass reaction flask equipped with mechanical stirrer, internal thermometer and reflux condenser. The reaction mixture was refluxed, with continuous stirring, for a period of about 17 hours. After this time the reaction mixture was diluted with water (200 ml.) and extracted twice with ether. The two ether extracts were combined, washed first with aqueous sodium hydroxide (100 ml.; 3 N), and then with water. The extract was then dried over magnesium sulfate, filtered and evaporated on a steam bath. The residue was vacuum distilled to yield 2-dimethylamino-3',5-dichlorobenzophenone as a yellow liquid having a boiling point of 130 to 135° C. at 0.02 mm. Hg pressure.

Example 16.—Preparation of 2-dimethylamino-3',5-dichlorobenzhydrol

A solution of lithium aluminum hydride (2.0 grams; 0.05 mol) in ether (100 ml.) was charged, with stirring, into a 500 ml. glass reaction flask equipped with stirrer, internal thermometer and reflux condenser. A solution of 2-dimethylamino-3',5-dichlorobenzophenone (11.7 grams; 0.04 mol) in ether (150 ml.) was then slowly added to the reaction flask over a period of about 15 minutes. The reaction mixture was then heated at reflux for a period of about 17 hours. The reaction mixture was cooled to room temperature. A solution of sodium potassium tartrate (2.0 grams) in water (8 ml.) was added dropwise, with stirring, to the cooled reaction mixture. The resulting mixture was filtered and the filter cake washed with ether. The filtrate was dried over magnesium sulphate, filtered and evaporated. The residue was distilled under vacuum to yield 2-dimethylamino-3',5-dichlorobenzhydrol having a boiling point of 144 to 148° C. at 0.02 mm. Hg pressure.

Example 17.—Preparation of S-ethyl-2-dimethylamino-3',5-dichlorobenzhydrylthiolcarbonate 2-dimethylamino-3',5-dichlorobenzhydrol (2.0 grams; 0.007 mol) and pyridine (30 ml.) were placed in a 250 ml. glass reaction flask equipped with stirrer and internal thermometer. Ethyl chlorothiolformate (0.9 grams; 0.007 mol) was slowly added to the reaction mixture which is kept below about 25° C. by external cooling. The mixture was stirred for a period of about 1 hour and water (200 ml.) was added. The reaction mixture was then extracted with ether and the ether extract dried over anhydrous magnesium sulfate and filtered. The ether solution was evaporated under about 0.02 mm. Hg pressure at about 50° C. for about 1 hour to yield S-ethyl-2-dimethylamino-3',5-dichlorobenzhydrylthiolcarbonate having the following elemental analysis.

Analysis for $C_{18}H_{19}Cl_2NO_2S$.—Theoretical, percent: C, 56.25; H, 4.98; S, 8.34. Found, percent: C, 56.95; H, 5.17; S, 7.84.

Other compounds which can be prepared by the methods shown in the foregoing examples and which are within the scope of this invention but which are not meant to limit this invention are S-methyl-2-dimethylamino-5-chlorobenzhydrylthiolcarbonate,
S-methyl-2-dimethylamino-5-chloro-4'-methylbenzhydrylthiolcarbonate,
S-methyl-2-dimethylamino-5-chloro-3'-methylbenzhydrylthiolcarbonate,
S-methyl-2-dimethylamino-5-chloro-2'-methylbenzhydrylthiolcarbonate,
S-methyl-2-dimethylamino-4',5-dichlorobenzhydrylthiolcarbonate,
S-methyl-2-dimethylamino-5-bromobenzhydrylthiolcarbonate,
S-methyl-2-dimethylamino-4',5-dibromobenzhydrylthiolcarbonate,
S-methyl-2-dimethylamino-5-chloro-4'-methoxybenzhydrylthiolcarbonate,
S-methyl-2-dimethylamino-5-chloro-3'-nitrobenzhydrylthiolcarbonate,
S-methyl-2-dimethylamino-5-methoxy-4'-nitrobenzhydrylthiolcarbonate,
S-methyl-2-dimethylamino-3'-allylbenzhydrylthiolcarbonate,
S-ethyl-2,4'-bis(dimethylamino)-5-chlorobenzhydrylthiolcarbonate,
S-ethyl-2-dimethylamino-5-chloro-3'-ethoxy-benzhydrylthiolcarbonate,
S-ethyl-2-dimethylamino5-bromo-2',4'-dimethylbenzhydrylthiolcarbonate, S-ethyl-2-dimethylamino-5-chloro-3'-allylbenzhydryl-
thiolcarbonate,
S-ethyl-2-dimethylamino-5-chloro-2'-isopropoxybenz-
hydrylthiolcarbonate,
S-ethyl-2-dimethylamino-5-chloro-4'-nitrobenzhydryl-
thiplcarbonate,
S-ethyl-2-dimethylamino-5-methoxy-2'-ethylbenzhydryl-
thiolcarbonate,
S-ethyl-2-diethylamino-5-chloro-2'-methylbenzhydryl-
thiolcarbonate,
S-ethyl-2-diethylamino-4-chloro-2'-ethylbenzhydrylthiol-
carbonate,
S-n-propyl-2-dimethylamino5-chloro-2'-methylbenz-
hydrylthiolcarbonate,
S-n-propyl-2-dimethylamino-4',5-dichlorobenzhydryl-
thiolcarbonate,
S-isopropyl-2-dimethylamino-3',5-dibromobenzhydryl-
thiolcarbonate,
S-n-butyl-2-dimethylamino-5-methyl-2'-ethylbenzhydryl-
thiolcarbonate, and the like.

For practical use as insecticides, the compounds of this invention are generally incorporated into insecticidal compositions which comprise an inert carrier and an insecticidally toxic amount of such a compound. Such insecticidal compositions, which can also be called formulations, enable the active compound to be applied conveniently to the site of the insect infestation in any desired quantity. These compositions can be solids, such as dusts, granules, or wettable powders; or they can be liquids such as solutions, aerosols, or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of insecticides can be dispersed under superatmospheric pressure as aerosols. However, preferred liquid insecticidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the insect infestation. The emulsifiers most commonly used in these concentrates are nonionic or mixtures of nonionic and anionic surface-active agents.

A typical insecticidal composition according to this invention is illustrated by the following example, in which the quantities are in parts by weight.

Example 18.—Preparation of a dust

Product of Example 1 _____ 10
Powdered talc _____ 90

The above ingredients are mixed in a mechanical grinder-blender and are ground until a homogenous free-flowing dust of the desired particle size is obtained. This dust is suitable for direct application to the site of the insect infestation.

The compounds of this invention can be applied as insecticides in any manner recognized by the art. One method for destroying insects comprises applying to the locus of the insect infestation, an insecticidal composition comprising an inert carrier and as the essential active ingredient, in a quantity which is toxic to said insects, a compound of the present invention. The concentration of the new compounds of this invention in the insecticidal compositions will vary greatly with the type of formulation and the purpose for which it is designed, but generally the insecticidal compositions will comprise from about 0.05 to about 95% by weight of the active compounds of this invention. In a preferred embodiment of this invention, the insecticidal compositions will comprise from about 5 to 75% by weight of the active compound. The compositions can also comprise such additional substances as other pesticides, stabilizers, spreaders, deactivators, adhesives, stickers, fertilizers, activators, synergists, and the like.

The compounds of the present invention are also useful when combined with other insecticides in the insecticidal compositions heretofore described. These other insecticides can comprise from about 5 to about 95% of the active ingredients in the insecticidal composition. Use of the combinations of these other insecticides with the componnds of the present invention provide insecticidal compositions which are more effective in controlling insects and often provide results unattainable with separate compositions of the individual insecticides. The other insecticides with which the compounds of this invention can be used in the insecticidal compositions to control insects, can include halogenated compounds such as DDT, methoxyclor, TDE, lindane, chlordane, isobenzan, aldrin, dieldrin, heptachlor, endrin, mirex, endosulfon, dicofol, and the like; organic phosphorous compounds such as TEPP, schradan, ethion, parathion, methyl parathion, EPN, dimeton, carbophenothion, phorate, zinophos, diazinon, malathion, mevinphos, dimethoate, DBD, ronnel, oxydemeton-methyl, dicapthon, chlorothion, phosphamidon, naled, fenthion, trichlorofon, DDVP, and the like; organic nitrogen compounds such as dinitro-o-cresol, dinitrocyclohexylphenol, DNB, DNP, binapacril, azobenzene, and the like; organic carbamate compounds such as carbaryl, ortho 5353, and the like; organic sulfur compounds such as phenothiazine, phenoxathin, lauryl thiocyanate, bis(2-thiocyanoethyl) ether, isobornyl thiocyanoacetate, and the like; as well as such substances usually referred to as fumigants, as hydrogen cyanide, carbon tetrachloride, calcium cyanide, carbon disulfide, ethylene diclorde, propylene dichloride, ethylene dibromide, ethylene oxide, methyl bromide, para-dichlorobenzene, and the like.

The compounds of the present invention can also be combined with fungicidal and nematocidal chemical compounds to form pesticidal compositions useful for the control of fungi and in some cases soil nematodes as well as insects. Typical examples of such fungicidal chemical compounds are ferbam, nabam, zineb, ziram, thiram, chloranil, dichlone, glyodin, cycloheximide, dinocap, manep, captan, dodine, PCNB, p-dimethylaminobenzene-diazo sodium sulfonate and the like; while examples of nematocidal compounds are chloropicrin, O,O-diethyl-O-(2,4-dichlorophenyl) phosphorothioate, tetrachlorothiophene, dazomet, dibromochloropropane, and the like.

The new compounds of this invention can be used in many ways for the control of insects. Insecticides which are to be used as stomach poisons or protective materials can be applied to the surface on which the insects feed or travel. Insecticides which are to be used as contact poisons or eradicants can be applied directly to the body of the insect, as a residual treatment to the surface on which the insect may walk or crawl, or as a fumigant treatment of the air which the insect breathes. In some cases, the compounds applied to the soil or plant surfaces are taken up by the plant, and the insects are poisoned systemically.

The above methods of using insecticides are based on the fact that almost all the injury done by insects is a direct or indirect result of their attempts to secure food. Indeed, the large number of destructive insects can be classified broadly on the basis of their feeding habits. Among the insects which can be effectively controlled by the compounds of the present invention are the chewing insects such as the Mexican bean beetle, the southern armyworm; the piercing-sucking insects, such as the pea aphid, the cereal leaf beetle, the house fly, the grape leafhopper, the chinch bug, the lygus bugs, the oyster sheel scale, the California red scale, the Florida red scale, the soft scale and mosquitoes; the internal feeders, including borers such as the European corn borer, the peach twig borer and the corn earworm; worms or weevils such as the codling moth, alfalfa weevil, cotton boll weevil, pink boll worm, plum curculio, red banded leaf roller, melonworm, cabbage looper and apple maggot; leaf miners such as the apple leaf miner, birch leaf miner; and gall insects such as the wheat joint worm and the grape phylloxera. Insects which attack below the surface of the ground are classified as subterranean insects and include such destructive pests as the wooly apple aphid, the Japanese beetle, the onion maggot, and the corn rootworm.

Mites and ticks are not true insects. Many economically important species of mites and ticks can be controlled by the compounds of this present invention such as the red spider mite, the two-spotted spider mite, the strawberry spider mite, the citrus rust mite, the cattle tick, the poultry mite, the citrus red mite, and the European red mite. Chemicals useful for the control of mites are often called miticides, while those useful for the control of both mites and ticks are known specifically as acaracides.

The quantity of active compound of this invention to be used for insect control will depend on a variety of factors, such as the specific insect involved, intensity of the infestation, weather, type of environment, type of formulation, and the like. For example, the application of only one or two ounces of active chemical per acre may be adequate for control of a light infestation of an insect under conditions unfavorable for its feeding, while a pound or more of active compound per acre may be required for the control of a heavy infestation of insects under conditions favorable to their development.

The utility of the compounds of the present invention as insecticides was illustrated in various experiments recognized by the art. In one series of experiments the test compounds were formulated by dissolving the compounds in acetone and dispersing the acetone solution in distilled water containing small amounts of emulsifier.

In one experiment carried out for the control of insects by feeding, lima bean leaves were sprayed on the top and bottom surfaces with the above formulation and offered to ten larvae of the southern army worm (late third instar stage) for a feeding period of 48 hours. After this period the mortality was observed. The result was as follows:

TABLE 1

| Test chemical | Concn. p.p.m. of test chemical | Percent mortality |
|---|---|---|
| Product of Example 14 | 3,500 | 100 |
| Control | | 0 |

In another experiment, for the control of the house fly, the test chemical was dissolved in acetone and dispersed in water containing small amounts of emulsifiers. Fifty adult flies were placed into each of several cages and sprayed with solutions of the test chemical. Mortality was observed after 48 hours giving the following results:

TABLE 2

| Test Chemical | Concn. p.p.m. of test chemical | Percent mortality |
|---|---|---|
| Product of Example 2 | 3,500 | 100 |
| Product of Example 11 | 3,500 | 100 |
| Product of Example 14 | 3,500 | 96 |
| Product of Example 17 | 3,500 | 100 |
| Control | | 0 |

The utility of the compounds of the present invention as acaricides was illustrated in experiments for the control of the two-spotted spider mite. In these experiments, the test compounds were formulated by dissolving in an organic solvent, such as acetone, and dispersing the solution in water containing a small amount of emulsifier such as polyoxyalkelene derivatives of monolaurate and/or monooleate. The above formulation was then applied to plants infested with 50 to 100 adults of the mites and held for five days. Thereafter adult mortality was observed. Some of the results were as follows:

TABLE 3

| Test Chemical | Concn. in p.p.m. of test chemicals | Percent mortality |
|---|---|---|
| Product of Example 5 | 3,500 | 100 |
| Product of Example 8 | 3,500 | 100 |
| Product of Example 11 | 3,500 | 100 |
| Do | 1,000 | 100 |
| Do | 100 | 100 |
| Product of Example 14 | 3,500 | 100 |
| Product of Example 17 | 3,500 | 100 |
| Control | | 0 |

We claim:
1. The compound of the formula

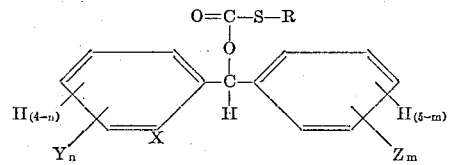

wherein X is dimethylamino or diethylamino; Y and Z are independently selected from the group consisting of alkyl containing up to 4 carbon atoms; allyl, chlorine, bromine, nitro, alkoxy containing up to 3 carbon atoms, dimethylamino, and diethylamino; R is alkyl containing up to 4 carbon atoms; $n$ is an integer from 0 to 4; and $m$ is an integer from 0 to 5.

2. The compound of claim 1, S-ethyl-2-dimethylamino-5-chlorobenzhydrylthiolcarbonate.

3. The compound of claim 1, S-ethyl-2-dimethylamino-5-chloro-4'-methylbenzhydrylthiolcarbonate.

4. The compound of claim 1, S-ethyl-2-dimethylamino-5-chloro-2'-methylbenzhydrylthiolcarbonate.

5. The compound of claim 1, S-ethyl-2-dimethylamino-5-chloro-3'-methylbenzhydrylthiolcarbonate.

6. The compound of claim 1, S-ethyl-2-dimethylamino-4',5-dichlorobenzhydrylthiolcarbonate.

7. The compound of claim 1, S-ethyl-2-dimethylamino-3',5-dichlorobenzhydrylthiolcarbonate.

References Cited

Kice: "Journal of the American Chemical Society," vol. 87 (1965), pp. 1734–39.

CHARLES B. PARKER, Primary Examiner

D. R. PHILLIPS, Assistant Examiner

U.S. Cl. X.R.

260—570; 424—301

PO-1050
(5/69)

UNITED STATES PATENT OFFICE
CERTIFICATE OF CORRECTION

Patent No. ___3,497,543___   Dated ___February 24, 1970___

Inventor(s) ___Sidney B. Richter and David P. Mayer___

It is certified that error appears in the above-identified patent and that said Letters Patent are hereby corrected as shown below:

Col. 1, lines 15-20, lines 40-45 and Claim 1, the structural formula should read as follows:

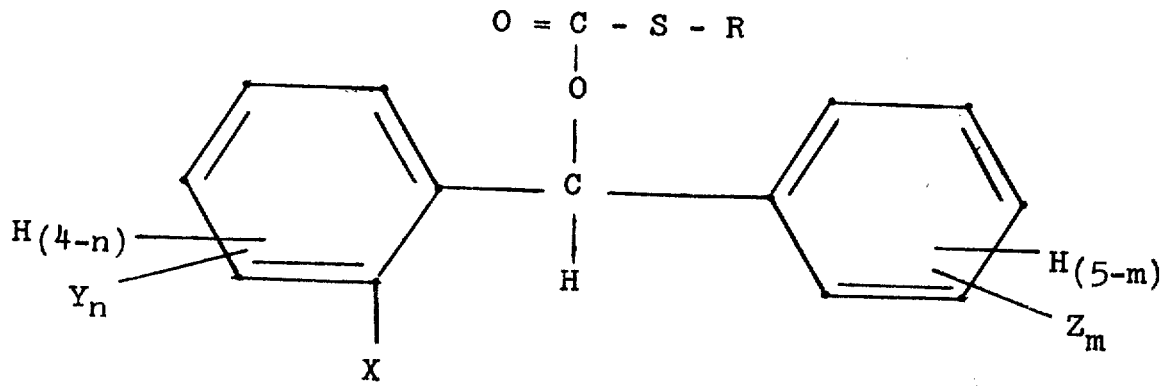

Col. 1, lines 53, "(ower alkyl)" should read --(lower alkyl)--.
Col. 3, line 43, "62.79" should read --C 62.79--; line 54, "17.44" should read --17.4--; line 70, "methylenzophenone" should read --methylbenzophenone--.
Col. 5, lines 6 and 7, "fodmaldehyde" should read --formaldehyde; line 70, "adde" should read --added--; line 75, "mixtuer" should read --mixture--.

SIGNED AND
SEALED
JUL 28 1970

(SEAL)
Attest:

Edward M. Fletcher, Jr.
Attesting Officer

WILLIAM E. SCHUYLER, JR.
Commissioner of Patents